(12) United States Patent
Nakagawa et al.

(10) Patent No.: US 7,963,554 B2
(45) Date of Patent: Jun. 21, 2011

(54) AIRBAG DEVICE AND STEERING WHEEL

(75) Inventors: Motokazu Nakagawa, Tokyo (JP); Hidetomo Oka, Tokyo (JP); Norihisa Okada, Tokyo (JP)

(73) Assignee: Takata Corporation, Tokyo (JP)

( * ) Notice: Subject to any disclaimer, the term of this patent is extended or adjusted under 35 U.S.C. 154(b) by 139 days.

(21) Appl. No.: 11/991,014

(22) PCT Filed: Nov. 10, 2006

(86) PCT No.: PCT/JP2006/322491
§ 371 (c)(1),
(2), (4) Date: Feb. 26, 2008

(87) PCT Pub. No.: WO2007/060848
PCT Pub. Date: May 31, 2007

(65) Prior Publication Data
US 2009/0261560 A1 Oct. 22, 2009

(30) Foreign Application Priority Data
Nov. 22, 2005 (JP) ................................. 2005-336823

(51) Int. Cl.
*B60R 21/16* (2006.01)
(52) U.S. Cl. .................... 280/731; 200/61.54; 200/61.55
(58) Field of Classification Search ................. 280/731, 280/728.2; 200/61.54, 61.55
See application file for complete search history.

(56) References Cited

U.S. PATENT DOCUMENTS

| 5,235,146 A | 8/1993 | Suzuki | |
|---|---|---|---|
| 6,079,737 A | 6/2000 | Isomura et al. | |
| 6,478,330 B2 * | 11/2002 | Fujita | 280/731 |
| 6,600,114 B2 * | 7/2003 | Kikuta et al. | 200/61.55 |
| 6,849,816 B2 * | 2/2005 | Rumpf | 200/61.54 |
| 7,621,560 B2 * | 11/2009 | Spencer et al. | 280/731 |
| 2003/0197355 A1 | 10/2003 | Bohn et al. | |
| 2005/0164537 A1 | 7/2005 | Sugimoto | |

FOREIGN PATENT DOCUMENTS

| DE | 203 09 521 | 10/2003 |
|---|---|---|
| JP | UH02-143734 | 12/1990 |
| JP | UH06-006157 | 1/1994 |
| JP | H10-106382 | 4/1998 |
| JP | H11-208405 | 8/1999 |
| JP | 2001-187576 | 7/2001 |

* cited by examiner

Primary Examiner — Eric Culbreth
(74) Attorney, Agent, or Firm — Manabu Kanesaka

(57) ABSTRACT

To provide an airbag device and a steering wheel capable of improving the operational feeling of horn.
An airbag device comprises: an airbag unit 2 having an airbag, an inflator 12 for inflating the airbag, and a cover 13 which is disposed to cover said airbag in the folded state, wherein as the cover 13 is pressed, the airbag unit 2 is moved in the pressing direction; a supporting plate 3 which is fixed to a steering wheel; three springs 4a-4c for biasing the airbag unit 2 in a direction opposite to the pressing direction; and three horn switches 5a-5c which are located outside of the springs 4a-4c in the radial direction of the steering wheel and close to the surface of the cover 13 in relation to the springs 4a-4c.

3 Claims, 4 Drawing Sheets

AIRBAG DEVICE AND STEERING WHEEL

TECHNICAL FIELD

The present invention relates to an airbag device which is installed in a vehicle and, more particularly, to a driver-side airbag device which has a horn switch and to a steering wheel with the airbag device.

BACKGROUND ART

A driver-side airbag device arranged in a steering wheel comprises a retainer, an airbag having a gas inlet of which periphery is attached to the retainer, a cover for covering the airbag in the folded state, and an inflator for generating gas. As the inflator is actuated to generate gas, the airbag is inflated, the cover is torn, and the airbag is largely deployed into a vehicle cabin.

As an example of the driver-side airbag device, there is an airbag device in which a horn switch is turned on by pressing the cover of the airbag so as to blare a horn. Such airbag devices are categorized into a type in which the airbag device is entirely moved in the direction of pressing and a type in which only the cover is moved in the direction of pressing.

As an example of the airbag device of the type in which the airbag device is entirely moved, there is an airbag device comprising an airbag unit. The airbag unit includes a retainer, an inflator which is fixed to the retainer to generate gas, a folded airbag, and a cover which is disposed to cover the folded airbag and is moved when the cover is pressed. The airbag device further comprises a supporting plate (supporting body) which is fixed to a steering wheel, a biasing means which is disposed between the airbag unit and the supporting plate to bias said airbag unit, and a horn switch which is disposed at substantially the same position as the biasing means between the airbag unit and the supporting plate (see Patent document 1, for example).

Patent document 1: Japanese Patent No. 3439336

DISCLOSURE OF THE INVENTION

Problems to be Solved by the Invention

In the aforementioned prior art, a basic structure of the steering wheel is disclosed, wherein the horn switch is turned on to blare a horn by pressing the cover to entirely move the airbag unit in the pressing direction. It is desired to improve operational feeling of horn in order to improve the performance of the steering wheel.

Therefore, the object of the present invention is to provide an airbag device and a steering wheel capable of providing improved operational feeling of horn.

Means for Solving the Problems

To achieve the aforementioned object, the first invention is characterized by comprising: an airbag unit having an airbag, an inflator for inflating the airbag, and a cover which is disposed to cover said airbag in the folded state, wherein said airbag unit is moved in a pressing direction when said cover is pressed; a supporting plate which is fixed to a steering wheel; at least one biasing means which is disposed between said airbag unit and said supporting plate to bias said airbag unit; and at least one horn switch which is located outside of said biasing means in the radial direction of said steering wheel and close to the surface of said cover in relation to said biasing means.

In the airbag device of the first invention, as an occupant presses the cover, the airbag unit is moved in the pressing direction so as to turn on the horn switch to blare a horn. Since small force is enough for turning on the horn switch when pressing an edge portion of the cover, it is often the case that the occupant presses an edge portion of the cover. When the edge portion of the cover is pressed, only a side of the airbag unit corresponding to the edge portion where is pressed moves in the pressing direction and the opposite side of the airbag unit does not move at all or practically at all so that the airbag unit is inclined relative to the supporting plate. Therefore, in case of the horn switch consisting of a moving contact disposed on the airbag unit and a fixed contact disposed on the supporting plate, for example, the closer to the edge of the cover to be pressed by the occupant the horn switch is located, the smaller the moving amount of the airbag unit for turning on the contacts is required.

In this case, in the first invention of the present invention, the horn switch is located outside of said biasing means in the radial direction of said steering wheel. That is, the horn switch is located closer to the edge portion of the airbag unit. This arrangement can reduce the moving distance of the contact as mentioned above. As a result, the pressing amount and pressing force onto the cover can be reduced, thereby improving the operational feeling of horn.

In the first invention of the present invention, the horn switch is located close to the surface of the cover in relation to the biasing means. That is, the horn switch is located on the surface side close to the cover which the occupant presses, thereby improving the operational feeling of horn as compared to a case where the horn switch is located far from the cover surface.

To achieve the aforementioned object, the second invention is characterized by comprising: an airbag; an inflator for inflating the airbag; a cover which is disposed to cover said airbag in the folded state, wherein said cover is movable in a pressing direction when pressed; a supporting plate which is fixed to a steering wheel; at least one biasing means which is disposed between said cover and said supporting plate to bias said cover; and at least one horn switch which is located outside of said biasing means in the radial direction of said steering wheel and close to the surface of said cover in relation to said biasing means.

In the airbag device of the second invention of the present invention, as the occupant presses the cover, the cover is moved in the pressing direction so as to turn on the horn switch to blare a horn. Since small force is enough for turning on the horn switch when pressing an edge portion of the cover, it is often the case that the occupant presses an edge portion of the cover. When the edge portion of the cover is pressed, only a side of the cover corresponding to the edge portion where is pressed moves in the pressing direction and the opposite side of the cover does not move at all or practically at all so that the cover is inclined relative to the supporting plate. In case of the horn switch consisting of a moving contact disposed on the cover and a fixed contact disposed on the supporting plate, for example, the closer to the edge of the cover to be pressed by the occupant the horn switch is located, the smaller the moving amount of the cover for turning on the contacts is required.

In this case, in the second invention of the present invention, the horn switch is located outside of the biasing means in the radial direction of the steering wheel. That is, the horn switch is located closer to the edge portion of the cover. This arrangement can reduce the moving distance of the contact as mentioned above. As a result, the pressing amount and pressing force onto the cover can be reduced, thereby improving the operational feeling of horn.

In the second invention of the present invention, the horn switch is located close to the surface of the cover in relation to the biasing means. That is, the horn switch is located on the surface side close to the cover which the occupant presses, thereby improving the operational feeling of horn as compared to a case where the horn switch is located far from the cover surface.

The third invention is characterized, in the aforementioned first or second invention, in that said horn switch is disposed on a leg member which is formed on a periphery of at least one of a group consisting of said airbag unit, said cover, and said supporting plate.

By forming the leg member into a suitable shape, the horn switch can be located outside of the biasing means in the radial direction of the steering wheel and close to the surface of the cover in relation to the biasing means.

The fourth invention is characterized, in the aforementioned third invention, in that said leg member has a radial extending portion which extends outward in the radial direction in said steering wheel and an axial extending portion which extends toward said cover surface.

In the fourth invention of the present invention, the horn switch is disposed on the leg member having the radial extending portion and the axial extending portion. As a result, the horn switch is located outside of the biasing means in the radial direction by the radial extending portion and the horn switch is located close to the surface of the cover in relation to the biasing means by the axial extending portion.

To achieve the aforementioned object, a steering wheel of the fifth invention comprises an airbag device of the first invention and a steering wheel main body.

EFFECT OF THE INVENTION

According to the present invention, it is possible to improve operational feeling of the horn.

BEST MODE FOR CARRYING OUT THE INVENTION

Hereinafter, a preferred embodiment of an airbag device and a steering wheel according to the present invention will be described with reference to attached drawings.

Figure 1:
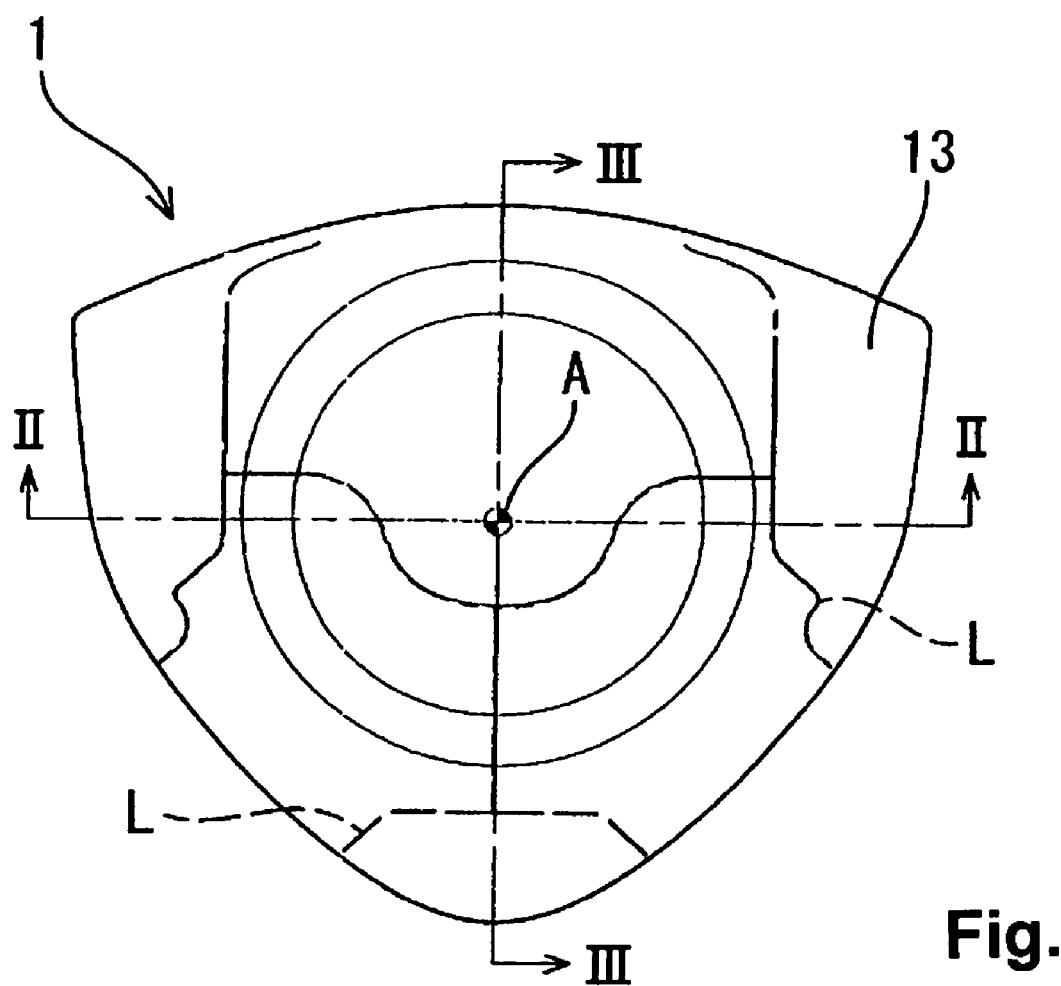
FIG. 1 is a top view showing the entire structure of an airbag device of an embodiment according to the present invention.
Figure 2:
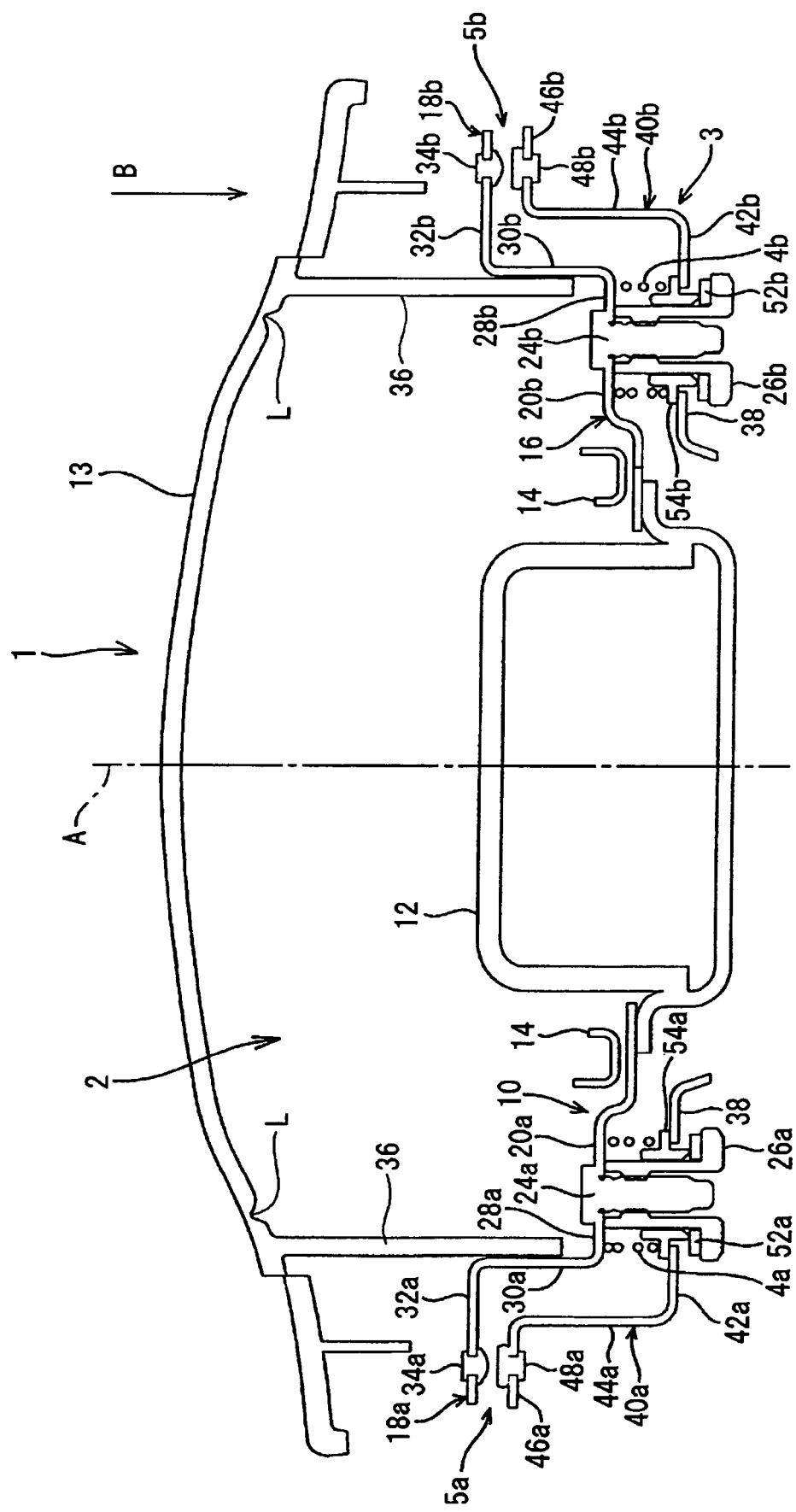
FIG. 2 is a cross-sectional view taken along a line II-II in FIG. 1 showing the entire structure of the airbag device of the embodiment according to the present invention.
Figure 3:
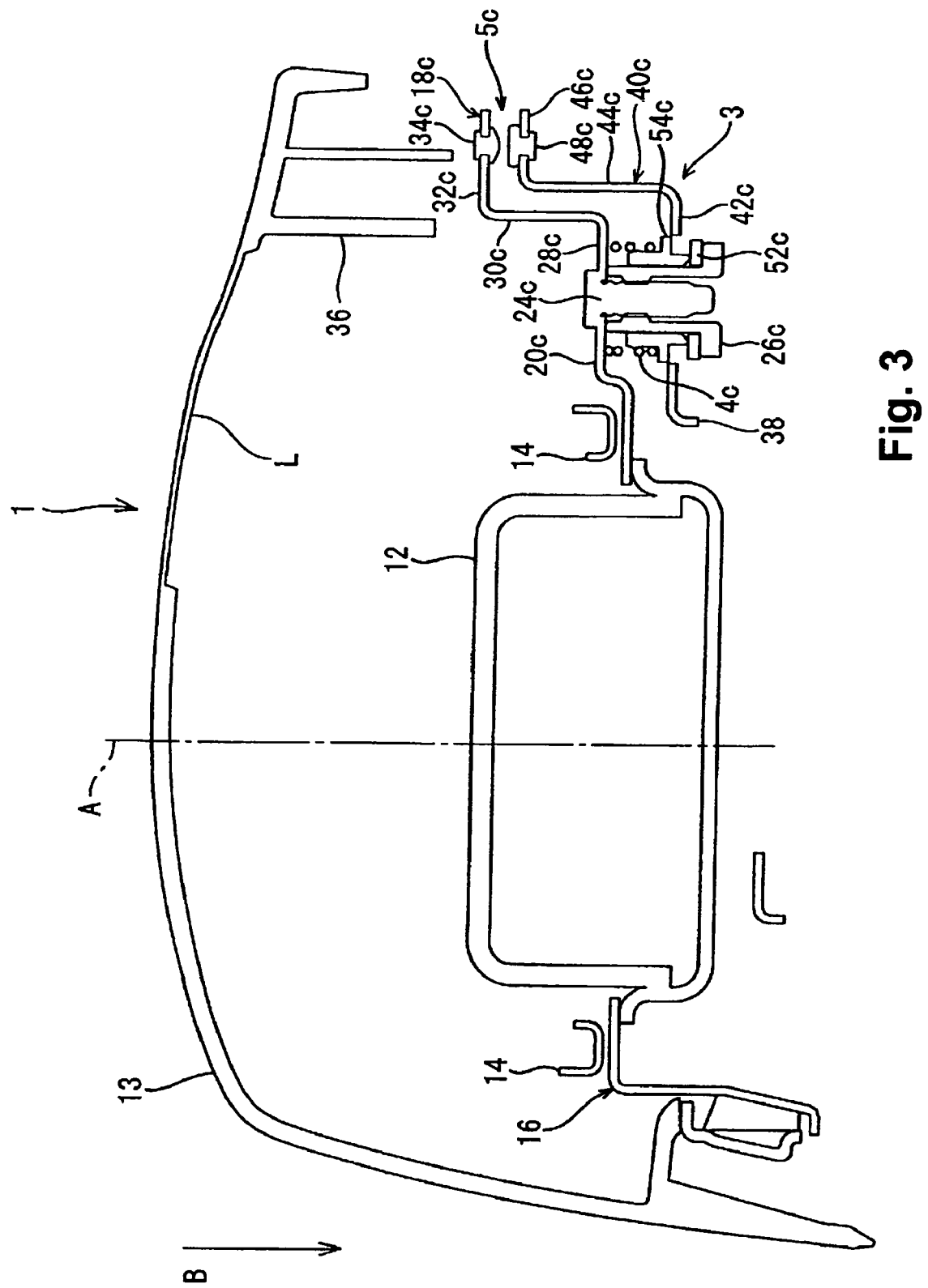
FIG. 3 is a vertical sectional view taken along a line in FIG. 1 showing the entire structure of the airbag device of the embodiment according to the present invention.
Figure 4:
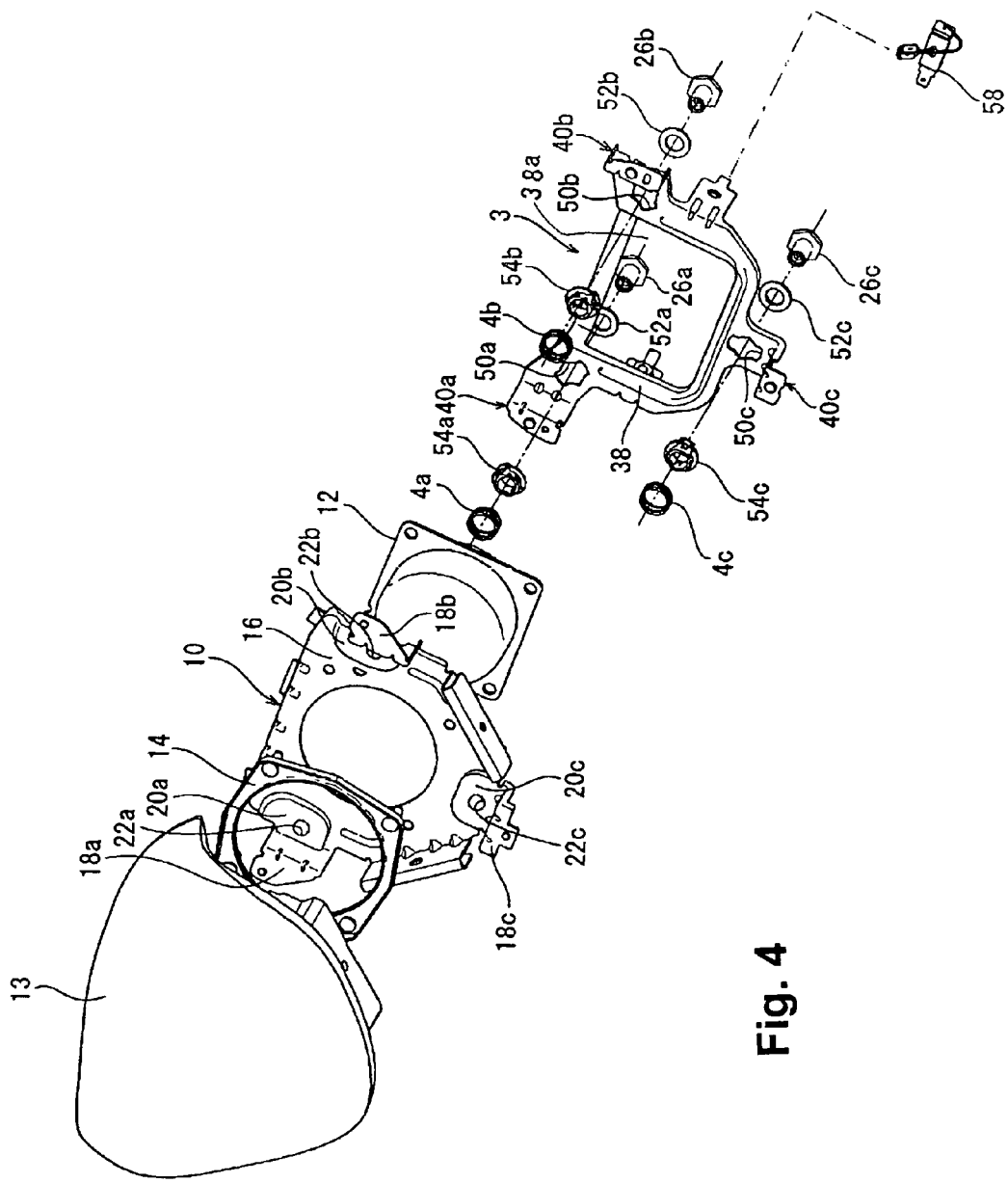
FIG. 4 is a perspective exploded view showing the entire structure of the airbag device of the embodiment according to the present invention.

FIG. 1 is a top view showing the entire structure of an airbag device of the embodiment according to the present invention, FIG. 2 is a cross-sectional view taken along a line II-II in FIG. 1, FIG. 3 is a vertical sectional view taken along a line III-III in FIG. 1, and FIG. 4 is a perspective exploded view of the airbag device.

In FIG. 1 through FIG. 4, a numeral 1 designates an airbag device attached to a steering wheel main body of a steering wheel of an automobile not shown. Though the steering wheel is usually inclined at a predetermined angle when used, the following description will be made assuming that the front side (upper side in FIG. 2 and FIG. 3) of the airbag device 1 is the upper side and assuming that the back side (lower side in FIG. 2 and FIG. 3) of the airbag device 1 is the lower side. In addition, the radial direction and the axial direction in the following description mean the radial direction about the axis A (see FIG. 1) of the steering wheel and the axial direction thereof, respectively.

The airbag device 1 comprises an airbag unit 2, a supporting plate 3 which is disposed below the airbag unit 2 and is fixed to the steering wheel main body, a plurality of (three in this embodiment) springs 4a-4c (biasing means) which are arranged between the supporting plate 3 and the airbag unit 2, a plurality of (three in this embodiment) horn switches 5a-5c which are disposed on the airbag unit 2 and on the supporting plate 3.

The airbag unit 2 comprises a retainer 10 as a base, an envelope-like airbag (not shown), an inflator 12 for spouting out gas for inflating the airbag, a cover 13, for covering the folded airbag, which is made of, for example, a resin, and a ring member 14 for fixing the airbag and the inflator 12 to the retainer 10.

The retainer 10 comprises a base plate section 16 having a polygonal flat plate shape, and three leg members 18a-18c each of which extends outward in radial direction from a location of each of the springs 4a-4c on the peripheral portion of the base plate section 16, is bent upward, and is further bent at the upper end to extend outward in the radial direction. The base plate section 16 and the leg members 18a-18c are formed integrally from a material having conductivity such as a metallic plate.

The base plate section 16 is provided on its peripheral portion with boss portions 20a-20c which are formed at three locations by raising from the other portion of the base plate section 16. The boss portions 20a-20c have bolt through holes 22a-22c (see FIG. 4) formed therein, respectively. Bolts 24a-24c are respectively inserted into the bolt through holes 22a-22c downward from the above and are respectively screwed into nuts 26a-26c as will be described later.

The leg members 18a-18c comprise base portions 28a-28c extending outward in the radial direction from the boss portions 20a-20c of the base plate section 16, standing portions 30a-30c extending upward (toward the surface of the cover) after being bent from the base portions 28a-28c, and arm portions 32a-32c extending outward in the radial direction after bent from the upper ends of the standing portions 30a-30c, respectively. Moving contacts 34a-34c, as will be described later, as components of the horn switches 5a-5c are disposed on the arm portions 32a-32c, respectively.

The standing portions 30a-30c are fixed to the wall 36 extending downward from the cover 13 by fixing means such as rivets (not shown).

On the other hand, the supporting plate 3 comprises a base plate section 38 having a substantially rectangular frame shape with an opening 38a, three leg members 40a-40c which are respectively located outside of the base plate section 38 below the leg members 18a-18c of the retainer 10 to extend outward in a radial direction from the base plate section 38, are bent upward, and are further bent at the upper ends to extend outward in the radial direction. The base plate section 38 and the leg members 40a-40c are formed integrally from a material having conductivity such as a metallic plate. A lower portion of the inflator 12 is located in the opening 38a (FIG. 2).

The leg members 40a-40c comprise base portions 42a-42c extending outward in the radial direction from the base plate section 38, standing portions 44a-44c extending upward (toward the surface of the cover) after bent from the base portions 42a-42c, and arm portions 46a-46c extending outward in the radial direction after bent from the upper ends of the standing portions 44a-44c, respectively. Fixed contacts 48a-48c, as will be described later, as components of the horn switches 5a-5c are disposed on the arm portions 46a-46c below the aforementioned moving contacts 34a-34c, respectively.

At the positions of the leg members 40a-40c corresponding to the bolt through holes 22a-22c of the retainer 10, the nut through holes 50a-50c are formed. The nuts 26a-26c are inserted into the nut through holes 50a-50c upward from below, respectively and are screwed onto the bolts 24a-24c, respectively.

The nuts 26a-26c are inserted into the nut through holes 50a-50c after inserted into washers 52a-52c. The bolts 24a-24c and the nuts 26a-26c are screwed to each other in a state where they are inserted into bushes 54a-54c and the springs 4a-4c between the retainer 10 and the supporting plate 3. According to this structure, the airbag unit 2 is biased upward relative to the supporting plate 3 by the three springs 4a-4c arranged around the bolts 24a-24c and the nuts 26a-26c such that the airbag unit 2 is restricted not to separate from the supporting plate 3 by a predetermined distance or more. When an occupant presses the cover 13 downward (in a direction of arrow B in the drawings), the airbag unit 2 is entirely movable in the pressing direction against the biasing force of the springs 4a-4c.

During this, the horn switches 5a-5c are composed of the moving contacts 34a-34c which are disposed on the arm portions 32a-32c of the leg members 18a-18c of the retainer 10 and the fixed contacts 48a-48c which are disposed on the arm portions 46a-46c of the leg members 40a-40c of the supporting plate 3. That is, the horn switches 5a-5c are arranged outside of the springs 4a-4c in the radial direction and above (close to the surface of the cover in relation to) the springs 4a-4c.

According to this structure, as the occupant presses the cover 13 to move the airbag unit 2 downward (in the direction of arrow B in the drawings), one or more of the moving contacts 34a-34c comes in contact with the fixed contacts 48a-48c so as to turn on the corresponding horn switches 5a-5c.

An ignition control harness (not shown), for controlling the ignition of the inflator 12, is connected to the inflator 12. A numeral 58 designates a harness, for the horn switches 5a-5c, which is connected to the supporting plate 3. One end of the ignition control harness 56 extends to the outside of the airbag device 1 and is connected to an inflator control circuit (not shown).

The vehicle to which the airbag device 1 is installed is provided with various sensors for detecting occurrence (or prediction) of vehicle collision (including a lateral collision) and rollover, but not shown. The inflator control circuit activates an initiator of the inflator 12 based on a detection signal from one of these sensors.

In the airbag device 1 having the aforementioned structure, as the occupant presses the cover 13 downward (in the direction of arrow B in the drawings), the airbag unit 2 is moved downward and one or more of the moving contacts 34a-34c disposed on the leg members 18a-18c of the retainer 10 comes in contact with the corresponding fixed contacts 48a-48c disposed on the leg members 40a-40c of the supporting plate 3 so that the corresponding horn switch 5a-5c is turned on to blare a horn.

On the other hand, in the event of an emergency such as a vehicle collision, one or more of the aforementioned sensors detects the emergency. Then, an activating signal is inputted from the inflator control circuit to the initiator of the inflator 12 so as to activate the initiator. According to the activation of the initiator, the inflator 12 is actuated to spout out gas for inflating the airbag, thereby inflating the airbag. At this point, the cover 13 is torn along tear lines L (see FIG. 1 and FIG. 3) so that the airbag is developed toward the occupant.

The airbag device 1 of this embodiment having the aforementioned structure and conducting the aforementioned action exhibits the following effects.

That is, in the airbag device 1 of this embodiment, as the occupant presses the cover 13, the airbag unit 2 is moved in the pressing direction (in the direction of arrow B in the drawings) and one or more of the horn switches 5a-5c is turned on, thereby blaring a horn as mentioned above. Generally, since small force is enough for turning on the horn switches 5a-5c, it is often the case that the occupant presses an edge portion of the cover 13. When the edge portion of the cover 13 is pressed, only a side of the airbag unit 2 corresponding to the edge portion where is pressed moves in the pressing direction and the opposite side of the airbag unit 2 does not move at all or practically at all so that the airbag unit 2 is inclined relative to the supporting plate 3. By the way, the nearer to the edge of the cover the horn switches 5a-5c are located, the smaller the moving amount of the airbag unit 2 (i.e. the moving amount of the cover 13) for turning on the contacts of one of the horn switches 5a-5c is required.

In this embodiment, the moving contacts 34a-34c and the fixed contacts 48a-48c are disposed on the arm portions 32a-32c and 46a-46c of the leg members 18a-18c and 40a-40c, respectively. Therefore, the horn switches 5a-5c are arranged outside of the springs 4a-4c in the radial direction and above (close to the surface of the cover) the springs 4a-4c. That is, the horn switches 5a-5c are located near the edge portion of the airbag unit 2.

This arrangement can reduce the moving distance of the moving contacts 34a-34c required for turning on one of the horn switches 5a-5c. As a result, the pressing amount and pressing force required for horn operation by the occupant can be reduced, thereby improving the operational feeling of horn.

Further, in this embodiment, the horn switches 5a-5c are located close to the surface of the cover in relation to the springs 4a-4c. That is, the horn switches 5a-5c are located on the surface side close to the cover 13 which the occupant presses, thereby improving the operational feeling of horn as compared to a case where the horn switches 5a-5c are located far from the cover surface.

Though the aforementioned embodiment has a structure in which when the occupant presses the cover 13, the airbag unit 2 is entirely moved to turn on one or more of the horn switches 5a-5c, the present invention is not limited thereto. That is, the present invention can be applied, for example, to an airbag device having such a structure that a cover itself is supported by springs such that the cover is movable and, when the occupant presses the cover, a moving contact disposed on the cover comes in contact with a fixed contact disposed on a supporting plate or the like. In this case, the cover is provided on its periphery with leg members and the horn switch is arranged similarly to the aforementioned embodiment, thereby obtaining effect of improving the operational feeling of horn similarly to the aforementioned embodiment.

What is claimed is:

1. An airbag device comprising:
an airbag unit having an airbag, an inflator for inflating the airbag, a retainer for holding the inflator, and a cover which is disposed to cover said airbag in a folded state, wherein said airbag unit is moved in a pressing direction when said cover is pressed;
a supporting plate fixed to a steering wheel and comprising a base plate section having an opening in which a lower portion of the inflator is disposed, and a plurality of first leg members integral with the base plate section, each of the first leg members having a lower portion extending radially outward from the base plate section, an upwardly extending mid-portion extending from the lower portion, and a radially extending upper portion extending radially outward from an upper end of the upwardly extending mid-portion;
at least one biasing member which is disposed between the retainer of said airbag unit and said supporting plate to bias said airbag unit in a direction opposite the pressing direction; and
at least one pair of horn switch contacts directly attached to the retainer and each of the radially extending upper portions of the supporting plate, and located outside said biasing member in a radial direction of said steering wheel and close to a surface of said cover in relation to said biasing member,
wherein said retainer includes a base plate section, and a plurality of second leg members extending upwardly and radially outwardly from an upper surface thereof over the first leg members, each of said second leg members having a base portion extending radially outwardly from the base plate section, a standing portion extending upwardly from the base portion, and an arm portion extending radially outwardly from the standing portion, and said pair of horn switch contacts comprises a movable contact and a fixed contact respectively connected with each of the arm portion and the upper portion of the first and second leg members.

2. An airbag device, comprising:
an airbag unit having an airbag, an inflator for inflating the airbag, a retainer for holding the inflator, and a cover which is disposed to cover said airbag in a folded state, wherein said airbag unit is moved in a pressing direction when said cover is pressed;
a supporting plate fixed to a steering wheel and comprising a base plate section having an opening in which a lower portion of the inflator is disposed, and a plurality of first leg members integral with the base plate section, each of the first leg members having a lower portion extending radially outward from the base plate section, an upwardly extending mid-portion extending from the lower portion, and a radially extending upper portion extending radially outward from an upper end of the upwardly extending mid-portion;
at least one biasing member which is disposed between the retainer of said airbag unit and said supporting plate to bias said airbag unit in a direction opposite the pressing direction; and
at least one pair of horn switch contacts directly attached to the retainer and each of the radially extending upper portions of the supporting plate, and located outside said biasing member in a radial direction of said steering wheel and close to a surface of said cover in relation to said biasing member,
wherein the biasing member comprises:
an elongate nut which extends through an opening in the supporting plate;
a bolt which is threadedly received in the nut and which fastens the retainer to a top of the nut;
a bush slidably disposed on an exterior of the nut; and
a spring disposed between the retainer and the bush and biasing the bush against a peripheral portion of the opening in the supporting plate and biasing the retainer away from the supporting plate.

3. An airbag device as claimed in claim 2, wherein the nut has a radial flange at a bottom thereof, the flange limiting an amount of sliding movement of the bush away from the retainer.

* * * * *